May 20, 1924.  
A. WEBER  
1,494,872  
EDUCATIONAL DEVICE  
Filed Sept. 28, 1923  2 Sheets-Sheet 1

INVENTOR  
August Weber  
BY  
William W. Varney  
ATTORNEY

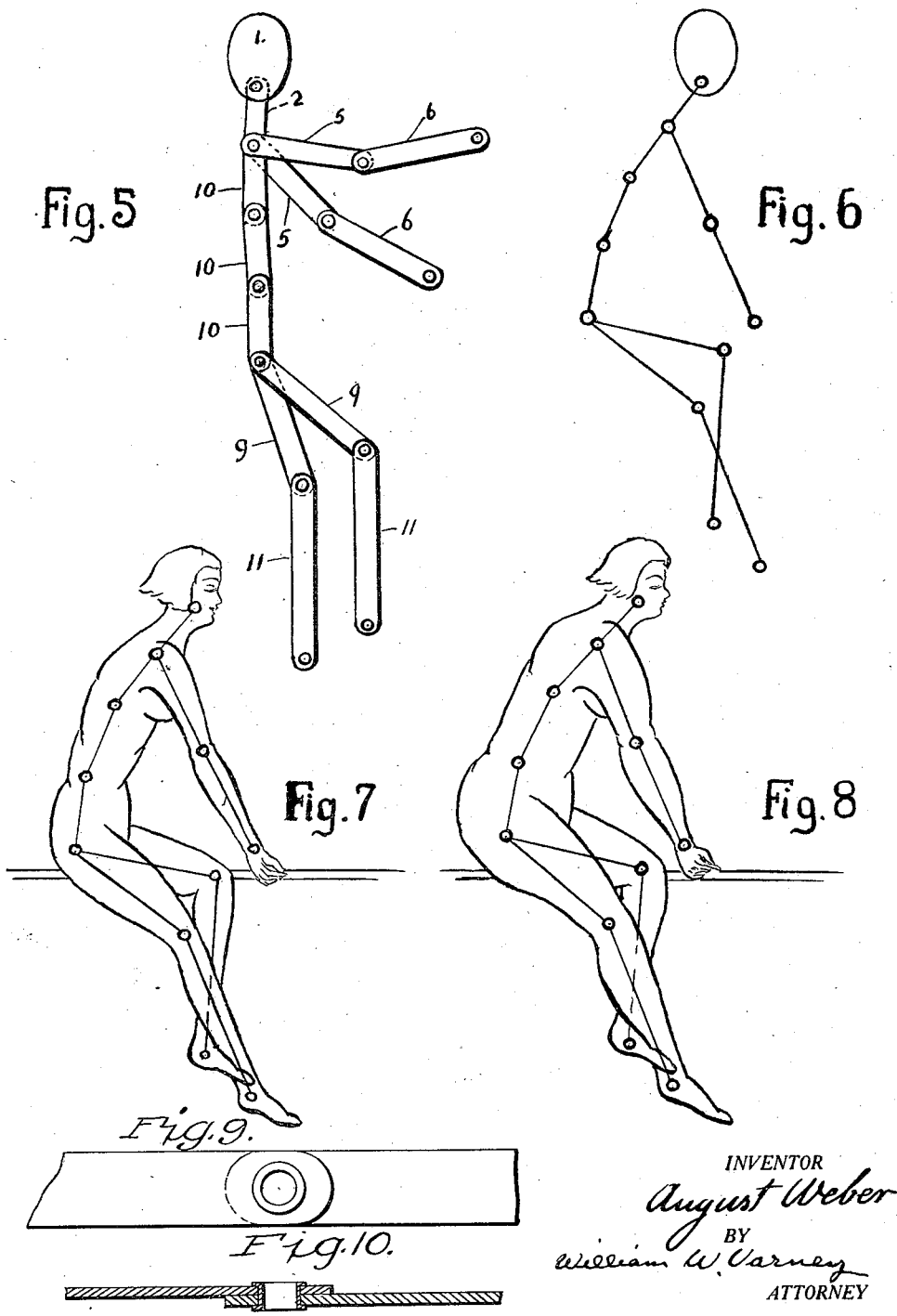

Patented May 20, 1924.

1,494,872

UNITED STATES PATENT OFFICE.

AUGUST WEBER, OF BALTIMORE, MARYLAND.

EDUCATIONAL DEVICE.

Application filed September 28, 1923. Serial No. 665,318.

*To all whom it may concern:*

Be it known that I, AUGUST WEBER, a citizen of the United States, and a resident of Baltimore city, in the State of Maryland, have invented a new and useful Educational Device, of which the following is a specification.

My invention relates to an educational device and has for its object the providing of a collapsable templet for assisting children in properly proportioning the major members of the human skeleton.

A further object of my educational device is the providing of a manikin templet in which are means of laying off on drawings placed thereunder the outline desired from the shape of the manikin mold placed over said drawing.

A further object of my educational device is the providing of a templet pivotly joined, easily collapsable, attractive in appearance, making it desirable for young and old to play with the same, forming grotesque or other shapes which the human body might be imagined to assume, and thereby educate their imagination, being governed by the proper proportions of the human frame.

With the foregoing and other objects in view, my invention consists of the novel construction, combination and arrangement of parts as hereinafter specifically described and illustrated in the accompanying drawing, wherein is shown the preferred embodiment of my invention, but it is understood that changes, variations and modifications can be resorted to which come within the scope of the claims hereunto appended.

Figure 1:
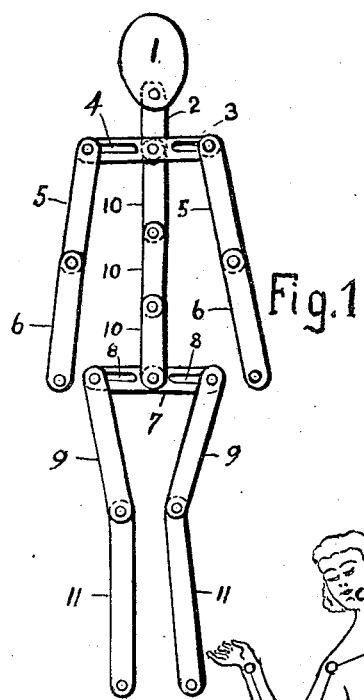
Figure 2:
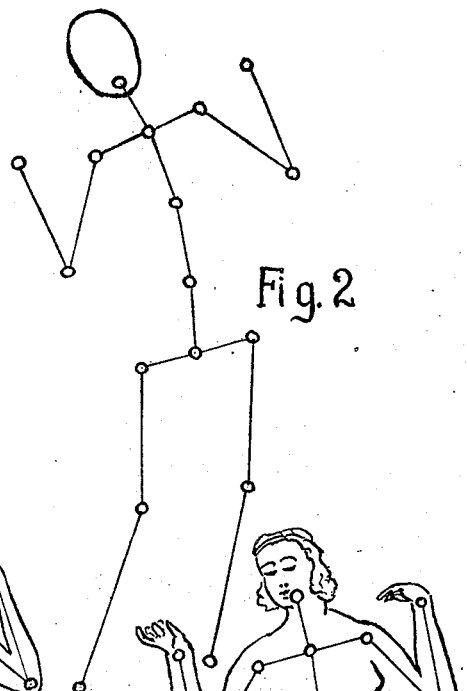
Figure 3:
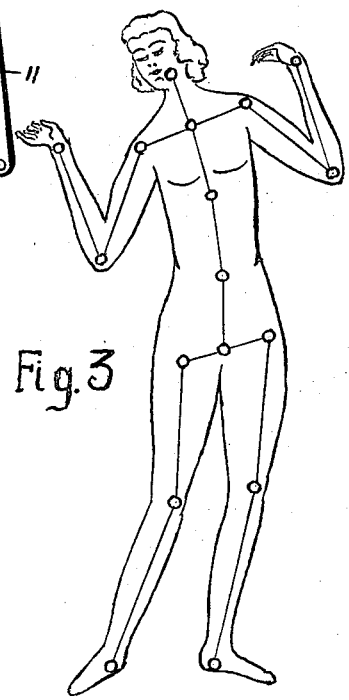
Figure 4:
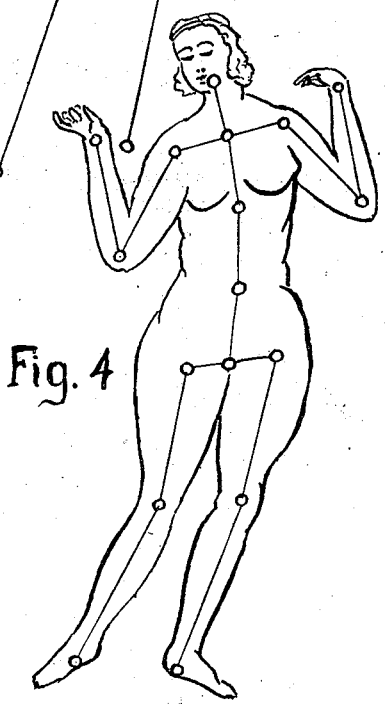

In the drawings of the herein-described embodiment of my invention Fig. 1 is a front view in elevation of my educational device adapted to show particularly the front view up to a quarter front view position of the human frame; Fig. 2 is a skeleton line on the drawing obtained by spotting through the perforations of the device shown in Fig. 1 when formed in desired shape; Fig. 3 is an outline of a slim human being formed on the skeleton line shown in Fig. 2; Fig. 4 is an outline of a stout human being formed on the skeleton line shown in Fig. 2; Fig. 5 is a view of a modified form of my educational device particularly adapted to show the contour of the human form particularly at right angles to the device shown in Fig. 1; Fig. 6 is a skeleton line on the drawing obtained by spotting through the perforations of the device shown in Fig. 5 when formed in desired shape; Fig. 7 is an outline of a slim human being formed on the skeleton line shown in Fig. 6, and Fig. 8 is an outline of a stout human being formed on the skeleton line shown in Fig. 6. Fig. 9 shows an enlarged view of the hollow pins or eyelets forming the joints in plan view and Fig. 10 is an enlarged view in section elevation of the joint shown in Fig. 9.

Similar numerals refer to similar parts throughout the several views.

My device is preferably made out of thin metal strips, although any suitable material may be used, such as celluloid (transparent material), card-board, wood, or the like. The various members of the device, or templet, are secured together by eyelets or other suitable means preferably containing an opening, or hole, to enable convenient marking upon the drawing underneath.

1 is a flat member to suggest the head; 2 is a member to suggest the neck, being pivoted to the head and to member 3 which is to suggest the distance between the shoulders. In member 3 are slots 4 in which the arms 5 above the elbows are pivoted to member 3 and may be changed from extreme out position, representing a full front view of the manikin to a quarter view of the manikin when members 5 are moved to the inner portion of slots 4. The lower arm member 6 is pivoted to the upper arm member 5. Hip member, 7 is provided with slots 8 in similar manner and for the same purpose as slots 4 are provided in member 3 and in which the pivots of upper leg members 9 are secured, and may be adjusted from an extreme outer to an extreme inner position according to the full front to quarter view desired.

Between shoulder member 3 and hip member 7 are a plurality of members 10 to represent the bending of the back-bone; three have been found sufficient in this case, and they are pivoted as shown. 11 are lower leg members.

As the device shown in Fig. 1 operates substantially in a plane, to get a side view of the human body another templet is necessary. That is shown in Fig. 5, wherein we have head 1, neck 2, upper arm 5, lower arm 6, upper leg 9, lower leg 11 and back members 10.

The operation of my device in one use that may be applied is shown in Figures 2 and 6 where the templet has been placed on the drawing and spots made through the eyelets of the various joints and said spots connected up, forming a skeleton line, which skeleton is filled out according to the taste or ability of the operator with lean or stout figures, as shown in Figures 3, 4, 7 and 8.

Having thus described my invention, what I claim and desire to secure by Letters Patent is—

1. An educational device comprising, joint members proportioned substantially to the visual proportions of the human body as to the major visual members thereof, the joints being provided with means of marking through the same.

2. In a manikin templet, pivoted members representing the arms and legs attached to shoulder and hip members respectively and provided with means of varying the distance between said arm and leg members on said shoulder and hip members respectively.

3. An educational device comprising, a head-member a neck member having pivotal connection with said head member, a shoulder member pivoted to said neck member, two upper arm members pivoted to said shoulder member, lower arm members pivoted to the upper arm members, a hip member, a plurality of back members pivoted to each other and one of which is pivoted to said shoulder member and another of which is pivoted to said hip member, two upper leg members pivoted to said hip member, lower leg members pivoted to said upper leg members and means of varying the distance between the pivoted joints of the members pivoted to the said shoulder and hip members respectively.

4. An educational device comprising, a head-member a neck member having pivotal connection with said head member, a shoulder member pivoted to said neck member, two upper arm members pivoted to the respective ends of said shoulder member, lower arm members pivoted to the upper arm members, a hip member, a plurality of back members pivoted to each other and one of which is pivoted to said shoulder member and another of which is pivoted to said hip member, two upper leg members pivoted to the respective ends of said hip member and lower leg members pivoted to said upper leg members.

AUGUST WEBER.

Witnesses:
EDWARD P. REYNOLDS,
WALTER R. HEATH.